Inventor
Jerrus M. Bryant

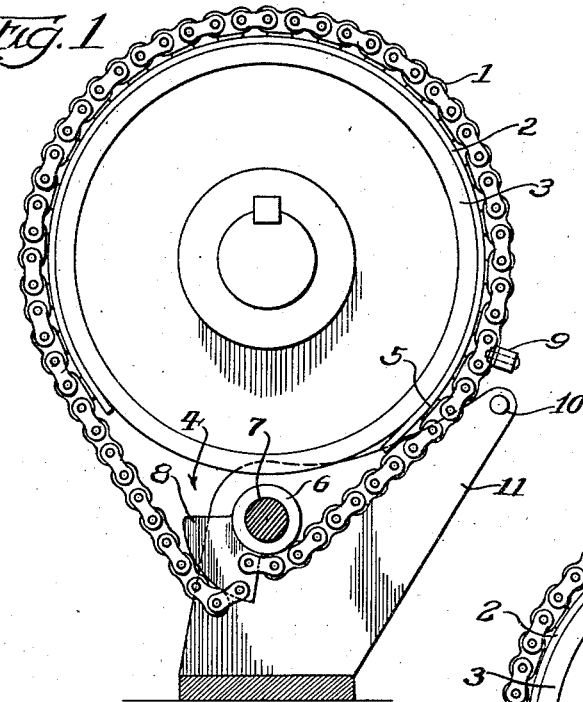
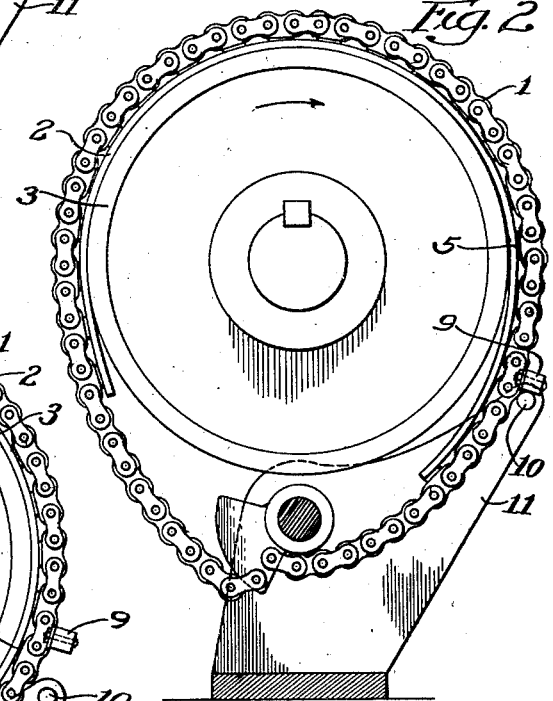
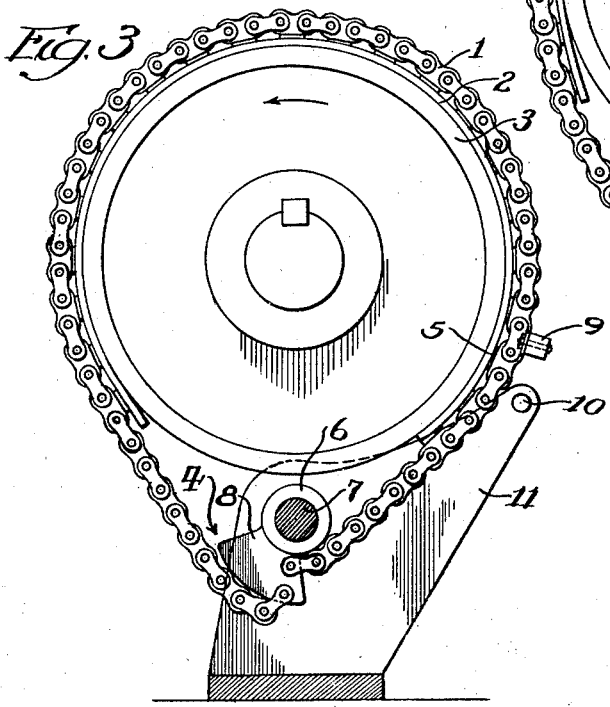

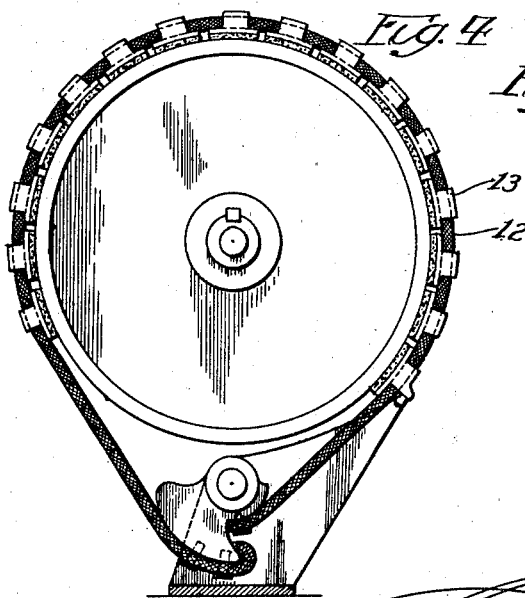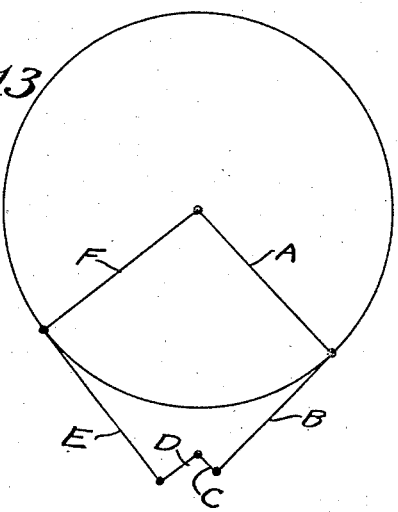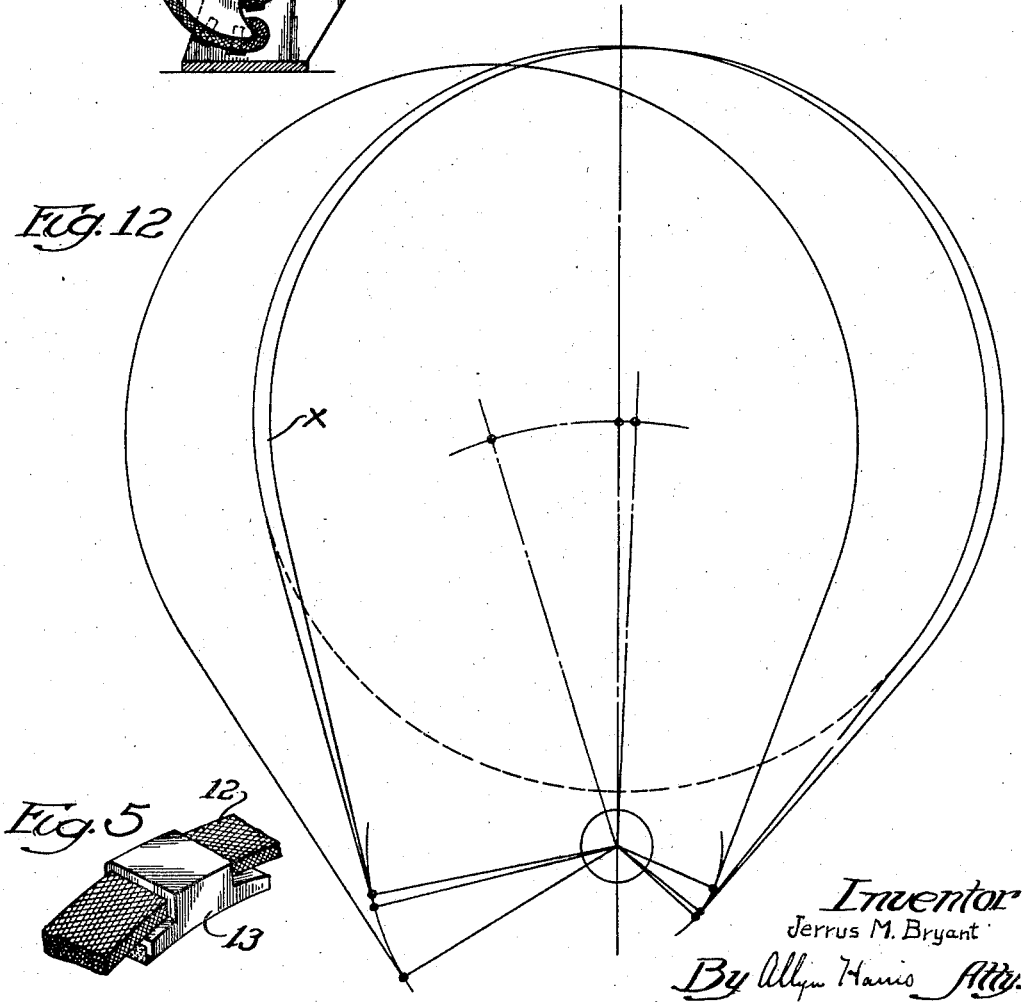

Patented Aug. 15, 1933

1,922,352

UNITED STATES PATENT OFFICE 1,922,352

CONTROL DEVICE

Jerrus M. Bryant, Philadelphia, Pa., assignor to Link-Belt Company, a Corporation of Illinois Application December 18, 1930
Serial No. 503,177

15 Claims. (Cl. 188—82)

This invention is concerned with improvements in devices for controlling rotary motion.

The principal object of the invention is to secure increased efficiency in such devices.

Other objects involve particular structural and functional characteristics, as hereinafter explained.

The principles of the invention have been developed in relation to the particular problems of design and operation of automatic one-way brakes and are so illustrated herein. However, insofar as said principles are applicable to the same or analogous problems in other types of brakes, clutches, or other devices for controlling rotary motion, the invention is not to be considered as restricted by the present disclosure.

Referring to the drawings,

Figures 1, 2 and 3 are views in end elevation illustrating the preferred form of the invention in neutral, running and locking positions, respectively.

Figure 4 is a similar view of a modified form of the invention.

Figure 5 is a detail view partly in section, of a portion of the structure shown in Figure 4.

Figure 12 is a composite diagrammatic view illustrating the action of the conventional brake.

Figure 13 is a diagrammatic view illustrating a desired relationship achieved by the present invention.

Figure 9:
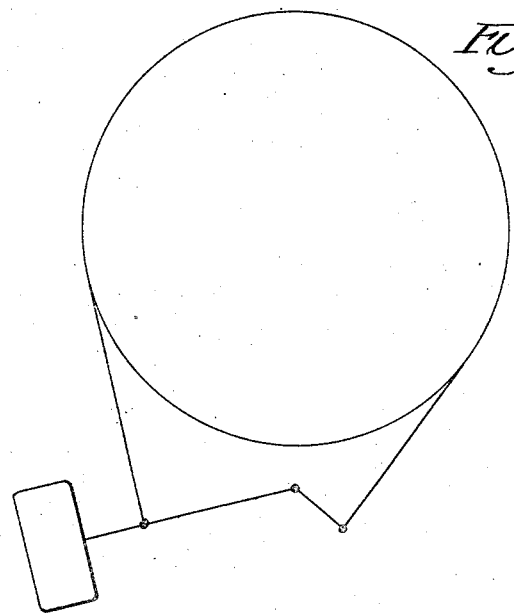
Figures 9, 10 and 11 are diagrammatic views illustrating the three positions of a conventional brake.
Figure 10:
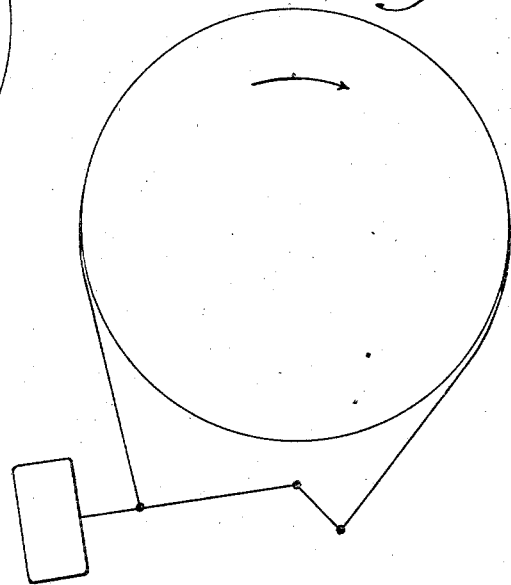
Figure 11:
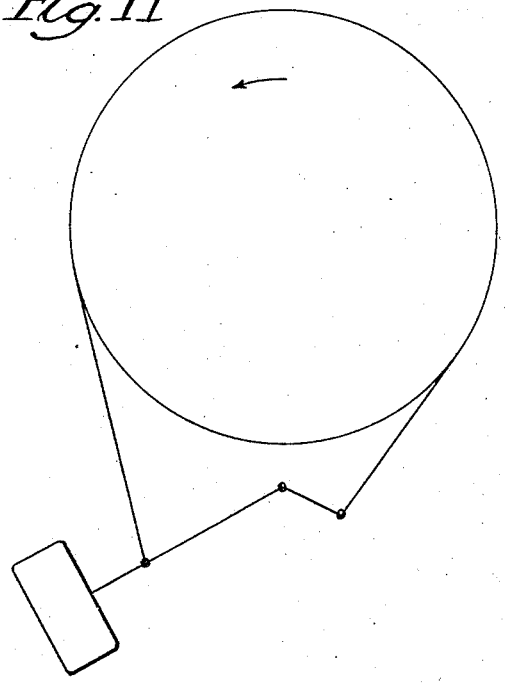

Brief consideration of a conventional brake of the type here involved will afford a basis for full appreciation of the advance made by the present invention. One such brake, known as the differential band brake, consists of a steel band encircling a brake wheel and having its ends anchored to the long and short arms, respectively, of a bell crank, whose axis lies below and in the vertical plane passing through the axis of the brake wheel. Figure 9, 10 and 11 diagrammatically represent such a brake. Ordinarily, one end of the band is anchored direct to the short arm of the bell crank, while the other end is secured to the long arm through an adjustable swivel connection. Also, the long arm is necessarily provided with a counterweight or equivalent means, for reasons to be presently mentioned. The purpose of brakes of this type is to automatically and positively prevent retrograde movement of power driven machinery. This, of course, necessitates the brake band remaining in operative relation to the brake wheel during long periods of normal running in order to be in constant readiness for automatic application to the brake wheel to prevent retrograde movement in the event of power failure.

There are three main factors affecting the efficiency of the conventional brake as above described. These are:

1. The brake band has three different positions with respect to the brake wheel, namely, neutral, normal running, and locking.
2. The steel band is manufactured to conform with the neutral position.
3. The steel band is flexible only at the expense of some effort.

The three positions above mentioned are diagrammatically illustrated in Figures 9, 10 and 11. In shifting from neutral to running position the band moves in one direction due to the drag of the band on the wheel and against the effort of the counterweight, while in shifting to locking position the band moves in the opposite direction from neutral position, assisted by the counterweight. Obviously, the normal contour of the band must be somewhat distorted in shifting from the neutral to the two operative positions, the amount of distortion being greater in the locking position. The extent of this distortion is indicated in Figure 12 which shows the band in three positions corresponding to the three positions of the bell crank, which it would assume if it were not required to coact with the brake wheel. Referring to Figure 10 wherein the band is shown in the running position, it will be observed that the band adheres closely to the periphery of the brake wheel throughout the major portion of its length, due to the action of the weight on the bell crank lever. Comparing this figure with position $x$ illustrated in Figure 12, the exact amount of distortion of the band in this position can be readily seen. The effect of this distortion is to create an uneven distribution of pressure throughout the area of the band in contact with the brake wheel, thus causing uneven or localized wear of the band. The natural pressure due to distortion of the band is considerably augmented by the weight on the bell crank lever, and the net result is comparatively rapid wear and relatively high horse power loss and temperature rise. In this connection it is noted that the weight is an unnecessary adjunct and produces only unfavorable results insofar as the running position of the brake is concerned.

The necessity for the counterweight comes in the shifting of the band from running to locking positions. Referring to Figure 12 it will be noted that the shift to locking position involves very considerable distortion of the band, and it is apparent that some external force is required to bring the band against the brake wheel with sufficient pressure to initiate the automatic locking action. This force is supplied by the counterweight and, in this connection, it is noted that the amount of force required is dependent upon the degree of flexibility of the band.

In the matter of size in relation to torque rating, the above characteristics impose a distinct limitation upon the design of conventional differential band brakes. Bearing in mind that in brakes of this type the tension of the band and the pressure of the band against the brake wheel increase in proportion to the increase in load, it will be appreciated that each brake must be designed for the particular load which it is intended to handle. This involves but two variable factors, assuming a constant coefficient of friction, viz., diameter of brake wheel and strength of the brake band. Now, in view of the characteristic action of this type of brake, it is absolutely essential that a certain degree of flexibility of band be maintained, and any substantial increase in width or thickness to secure increased strength would so far impair the flexibility as to result in an impractical, if not entirely inoperative structure. Hence, to provide for increased loads there is no alternative but to increase the diameter of the brake wheel. Obviously, this necessitates extremely large and cumbersome brake structures in many instances.

There is one other factor adversely affecting the efficiency of the conventional brake as above described. In all band brakes there is a natural tendency to form an air film between the band and brake wheel, particularly in high speed applications, and this film tends to float the band out of contact with the wheel, thus reducing friction and wear and carrying off the heat generated. This, of course, applies to the normal running position wherein it is desired that the band remain in sufficiently close cooperative relation to the wheel ready for automatic locking, and with a minimum of wear and horsepower loss. In the brake above described the formation of this beneficial air film is largely defeated due to the close adherence of the band to the brake wheel under the influence of the counterweight. The comparative stiffness and weight of the band and its somewhat distorted condition in the running position also resist formation of the air film.

The limitations and imperfections developed above are the outstanding problems of the present known differential brake designs, and it was with particular reference to these that the present invention was developed. Referring now to the preferred form of the invention illustrated in Figures 1, 2 and 3 in neutral, running and locking positions respectively, the improved brake consists of a freely flexible limp, or pliable band 1 provided with a suitable friction facing 2 for cooperation with the periphery of brake wheel 3, and having its ends operatively associated with the long and short arms, respectively, of a bell crank lever 4. In referring to band 1 as being freely flexible, limp, or pliable it is intended to definitely differentiate from bands which are merely resilient, which tend to return to a normal shape, and which require the expenditure of appreciable effort to move out of normal shape. This distinction is of the essence of the invention. The freely flexible, limp, or pliable band may take a variety of forms, the particular one here shown consisting of an ordinary link chain. The friction lining 2 may be of segmental form or of band form, as shown, and may be secured to the brake band by attaching lugs 5 of any desired form, secured to or formed on each or alternate links. Obviously, the exact nature of the friction lining and the particular method of attaching the same to the freely flexible band are relatively unimportant and are details which may be widely varied without materially effecting the more important characteristics of the invention.

Insofar as the essential characteristics of the invention are concerned, the bell crank may be of conventional or any other form having arms of unequal length to which the respective ends of the freely flexible band may be secured. However, there has been developed an improved form of bell crank adaptable only to the freely flexible type of brake band and affording refinements of operation when so used. The improved bell crank 4 consists of a circular hub member 6 concentric with shaft 7 on which it is mounted, and a segment 8 integral with or secured to hub member 6 and having a curved periphery concentric with the hub member. Both ends of the freely flexible band are secured to the segment 8 one inwardly so that the band contacts with the periphery of the hub, and the other outwardly so that end of the band engages the periphery of the segment. Referring to the diagrammatic view, Figure 13, wherein lines A and F represent radii extending to the two points of tangency of the band with the wheel, E and B represent the respective ends of the band from points of tangency to points of contact with their respective arms of the bell crank, and C and D represent radii of the segment and hub member respectively, extending from the effective points of contact of their respective band ends, it will be noted that the lines of the pairs A and B, B and C, D and E, and E and F are substantially at right angles to each other. By reason of the concentricity and uniform radius of the two operative portions of the bell crank, this relationship prevails in both the neutral and locking positions and, in the latter, irrespective of the particular point at which complete locking occurs. Thus, the arc of contact of the band and drum remains constant. However, a different condition exists with the parts in normal running position as will be presently described.

A further refinement which, though not essential, contributes to the efficiency of the improved brake, consists in the provision of a stop 9 on the outer surface of the band for cooperation with an abutment 10 secured to a lateral extension of the bracket 11 in which the bell crank is mounted. This stop serves to limit circumferential movement of the band in the running position.

Considering now the operating characteristics of the form of improved brake above described, and referring particularly to Figure 2 illustrating the same in the running position, it will be noted that the arc of contact of the freely flexible band with the brake wheel is only about 180°. It will also be noted that the band floats freely on the wheel, with no force of any kind tending to produce pressure between the band and wheel other than the weight of the band alone. It is apparent that with this condition the very slight pressure which may exist due to the weight of the band is uniformly distributed over the entire arc of contact. Hence, wear on the band is exceedingly slight and entirely uniform.

The improved brake utilizes to the fullest extent the natural tendency toward the formation of an air film between the band and wheel. This is due solely to the freely flexible nature of the band. As shown in Figure 2 the band is floating freely on the wheel under the force of its weight alone and it is quite apparent that it offers but slight resistance to the formation of the beneficial air film which tends to materially reduce power loss and wear. It has been clearly established by working tests that the air film does exist and is very effective in use of this new brake. This, of course, is particularly true of high speed applications of the brake.

The slight pressure of the band on the drum due to its weight is sufficient to cause the band to move from running position, Figure 2, to the locking position, Figure 3, when the brake wheel moves in the reverse or counter clockwise direction. The band being freely flexible, limp, or pliable, does not offer appreciable resistance to this change of position and consequently does not require the application of external force, as by means of counterweight or springs, to insure bringing about the change. The free flexibility also results in highly sensitive or responsive braking action.

Another important feature of the new brake is that the band may be made of any desired strength without impairing its operating characteristics, thus making it possible to construct the brake wheel of any desired size or range of sizes, irrespective of the loads to be handled. In most cases involving given loads it will be entirely feasible, with the improved brake, to substantially reduce the diameter of the brake wheel and compensate in band strength. The advantages of this feature are many, among which is the possibility of incorporating the brake in existing transmission or other housings, or in separate specially designed brake housings of relatively small size.

Summarizing, the improved brake offers the following advantages over conventional types:

1. Substantial reduction in power loss during normal running.
2. Possible reduction in size for given torque rating.
3. Simplified construction—omission of counterweights, springs etc.
4. More sensitive and dependable action.
5. General increased efficiency.

Another form of the invention is illustrated in Figures 4 and 5. This form in construction and operation is in all respects the same as that above described, except that the freely flexible, limp, or pliable band 12 is formed of woven wire instead of chain. As shown, the member 12 is in the form of a woven wire band, but it should be appreciated that it may be constructed of wire rope or woven wire of any desired cross section. The band may be provided with friction segments 13 as shown, or with a strip of friction lining. The operating characteristics of this form are substantially the same as of the preceding form.

Figure 6:
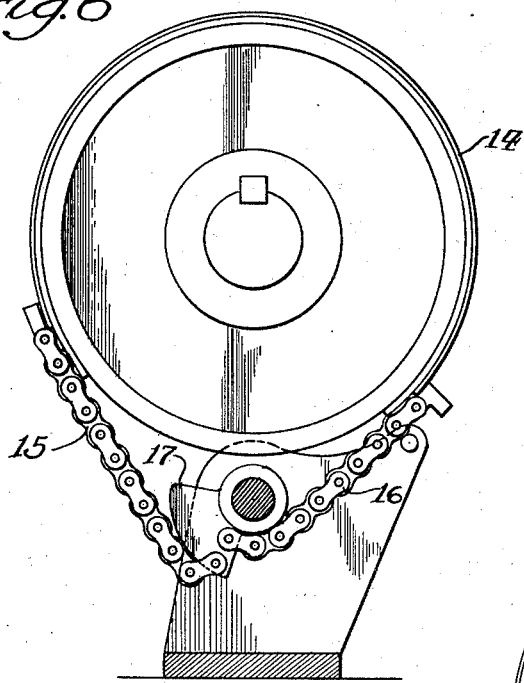
Figures 6, 7 and 8 are views corresponding to Figures 1, 2 and 3, but illustrating a second modification of the invention.
Figure 7:
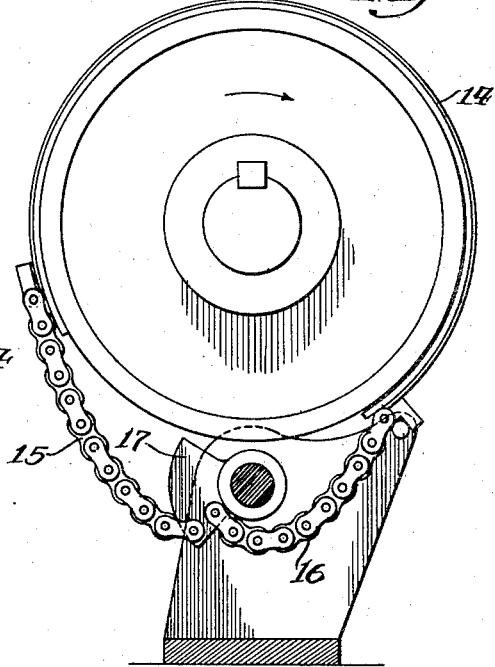
Figure 8:
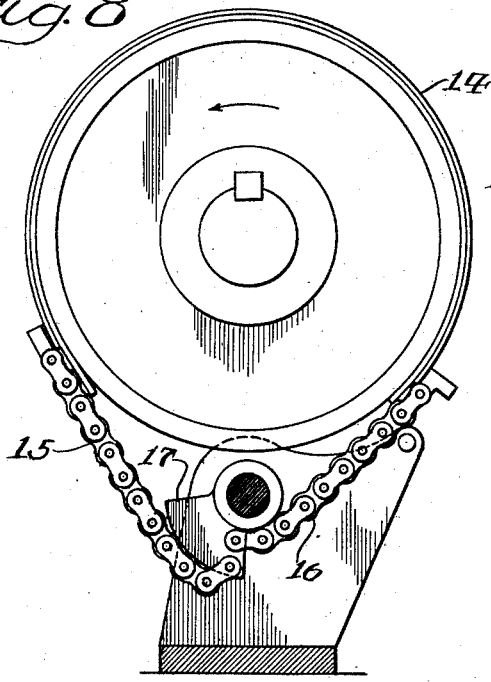

A third form of the invention is represented in Figures 6, 7 and 8. According to this construction the band 14 is of the conventional resilient steel type and is of set form corresponding to the contour of the brake wheel. It will be noted however, that the extent of the band is its arc of contact with the wheel and that it does not leave the wheel tangentially and extend to and have connection with the respective arms of the bell crank, as in the conventional construction. The connections 15 and 16 between the bell crank 17 and ends of the band are of a freely flexible, limp, or pliable nature, and herein lies the essence of this form of the invention. The connections 15 and 16 may consist or ordinary chain as shown, or of wire rope, woven wire band or other freely flexible, limp, or pliable means. The bell crank, the support therefor and the band stop are essentially the same as in the preceding forms.

Referring to Figures 7 and 8 illustrating the running and locking positions, respectively, of this third form of the invention, the important point to be noted is that movement from one of these positions to the other does not involve distortion of the band. Due to the freely flexible, limp, or pliable nature of the connections between the band ends and bell crank, the movement of the band is truly circumferential and it does not tend to assume the positions diagrammatically illustrated in Figure 12. Consequently, the band is not subjected to localized stresses, nor is it necessary to utilize a counterweight to secure conformance of the band to the wheel or to produce the friction requisite to initiation of the automatic locking action. In the running position the band floats freely on the surface of the brake wheel without restraint from the bell crank connections, and slightly out of contact with the wheel on one side due to the action of the automatic stock. This construction permits the formation of an air film between the band and wheel and thus promotes efficiency. Bearing in mind that distortion of the band is not involved, the normal friction between band and wheel is sufficient to initiate the automatic locking action upon reverse rotation of the wheel.

This invention consists in the development and solution of certain definite problems by the application of certain principles of construction and operation, as specially outlined herein. The constructions are simple, capable of wide variation and application, and readily adaptable to the substitution of a wide range of equivalents. Consequently, the particular structures shown are to be regarded as illustrative of the principles and not as limitations upon the invention.

I claim:

1. An automatic one-way brake comprising a brake wheel, a resilient metallic band constructed to conform to the contour of said wheel and encircling a portion of the circumference of the same, a bell crank lever secured to a relatively stationary support and having effective lever arms of unequal length, and limp means for connecting the respective ends of said band to the long and short lever arms, respectively, of said bell crank lever.

2. An automatic one-way brake comprising a brake wheel, a band encircling a portion of said wheel, a bell crank, connections from said bell crank to the respective ends of said band, said bell crank comprising concentric arcuate portions of relatively unequal radii, on whose peripheries said connections engage.

3. An automatic one-way brake comprising a brake wheel, a bell crank composed of concentric arcuate portions of relatively unequal radii, and a band encircling a portion of said wheel and having its ends operatively associated with the peripheries of the respective portions of said bell crank.

4. An automatic one-way brake comprising a brake wheel, a bell crank composed of concentric arcuate portions of relatively unequal radii, and a band encircling a portion of said wheel and having freely flexible ends extending to and having operative engagement with the peripheries of the respective arcuate portions.

5. An automatic one-way brake comprising a brake wheel, a bell crank lever having relatively fixed support, a band encircling a portion of said wheel and having its ends operatively connected to said bell crank, a stop on said band, and a cooperating stationary abutment for limiting movement of said band in one direction.

6. An automatic one-way brake comprising a brake wheel having a normal direction of rotation, and a brake for limiting reverse rotation of said wheel, said brake comprising a freely flexible band surrounding a portion of said wheel and adapted to have frictional engagement therewith, a relatively fixed bell crank having effective lever arms of unequal length with which the respective ends of the band are operatively connected, and means for limiting movement of the band in the direction of normal rotation of the brake wheel.

7. In an automatic one-way brake, a circular member to be controlled, a brake band encircling a portion of the periphery of the member, and a means connected to the free extremities of the band constructed to cause a differential pull to be applied to the ends of the latter to hold the member against rotation relative thereto in one direction, portions of the band extending from the said member to the said means being of limp construction to permit the band to lightly bear on said member with uniform pressure throughout their contacting area when the member rotates in the opposite direction.

8. In an automatic one-way brake, a circular member to be controlled, a brake band encircling a portion of the periphery of the member, and means connected to the free extremities of the band constructed to cause a differential pull to be applied to the ends of the latter to hold the member against rotation relative thereto in one direction, the portion of the band which encircles the said member being resilient metal, and portions of the band extending from the said member to the said means being of limp construction to permit the band to lightly bear on said member with uniform pressure throughout their contacting area when the member rotates in the opposite direction.

9. In an automatic one-way brake, a circular member to be controlled, a brake band encircling a portion of the periphery of the member, and means connected to the free extremities of the band constructed to cause a differential pull to be applied to the ends of the latter to hold the member against rotation relative thereto in one direction, the band being of limp construction to permit it to lightly bear on said member with uniform pressure throughout their contacting area when the member rotates in the opposite direction.

10. In an automatic one-way brake, a circular member to be controlled, a brake band encircling a portion of the periphery of the member, means connected to the free extremities of the band constructed to cause a differential pull to be applied to the ends of the latter to hold the member against rotation relative thereto in one direction, portions of the band extending from the said member to the said means being of limp construction to permit the band to lightly bear on said member with uniform pressure throughout their contacting area when the member rotates in the opposite direction, and means to limit movement of the band with the circular member when the latter starts to rotate in the last mentioned direction.

11. In an automatic one-way brake, a circular member to be controlled, a brake band encircling a portion of the periphery of the member, means connected to the free extremities of the band constructed to cause a differential pull to be applied to the ends of the latter to hold the member against rotation relative thereto in one direction, the band being of limp construction to permit it to lightly bear on said member with uniform pressure throughout their contacting area when the member rotates in the opposite direction, and means to limit movement of the band with the circular member when the latter starts to rotate in the last mentioned direction.

12. In an automatic one-way brake, a circular member to be controlled, a brake band encircling a portion of the periphery of the member, said band having pliable end portions out of contact with the circular member, and a bell crank structure having lever arms of unequal length connected respectively to the extremities of said end portions to cause a differential pull to be applied to said end portions to hold the member against rotation relative to the band in one direction, the arms of said bell crank comprising concentric arcuate band engaging portions of constant radii throughout their lengths.

13. In an automatic one-way brake, a circular member to be controlled, a brake band encircling a portion of the periphery of the member, and a bell crank connected to the ends of said band, said bell crank comprising concentric arcuate band contacting portions of relatively unequal radii to cause a differential pull to be applied to the ends of the band during rotation of the circular member in one direction relative the band, portions of the band extending from the said member to the bell crank being of limp construction to permit the band to lightly bear on said member with uniform pressure throughout their contacting area when the member rotates in the opposite direction.

14. In an automatic one-way brake, a circular member to be controlled, a brake band encircling a portion of the periphery of the member, and a bell crank connected to the ends of said band, said bell crank comprising concentric arcuate band contacting portions of relatively unequal radii to cause a differential pull to be applied to the ends of the band during rotation of the circular member in one direction relative the band, the portion of the band which encircles the said member being formed of resilient material, and portions of the band extending from the said member to the bell crank arms being of limp construction to permit the band to lightly bear on said member with uniform pressure throughout their contacting area when the member rotates in the opposite direction.

15. In an automatic one-way brake, a circular member to be controlled, a brake band encircling a portion of the periphery of the member, and a bell crank connected to the ends of said band, said bell crank comprising concentric arcuate band contacting portions of relatively unequal radii to cause a differential pull to be applied to the ends of the band during rotation of the circular member in one direction relative the band, the band being of limp construction to permit it to lightly bear on said member with uniform pressure throughout their contacting area when the member rotates in the opposite direction.

JERRUS M. BRYANT.